(12) United States Patent
Carlsson et al.

(10) Patent No.: US 6,792,717 B2
(45) Date of Patent: Sep. 21, 2004

(54) VEHICLE DOOR OPERATING MECHANISM (75) Inventors: Johan Carlsson, Höör (SE); Lars Linden, Hörby (SE); Martin Persson, Hörby (SE)

(73) Assignee: Hubner GmbH, Kassel (DE)

( * ) Notice: Subject to any disclaimer, the term of this patent is extended or adjusted under 35 U.S.C. 154(b) by 0 days.

(21) Appl. No.: 10/440,803

(22) Filed: May 19, 2003

(65) Prior Publication Data

US 2003/0188488 A1 Oct. 9, 2003

Related U.S. Application Data (63) Continuation of application No. PCT/SE01/02572, filed on Nov. 21, 2001.

(30) Foreign Application Priority Data

Nov. 21, 2000 (SE) ............................................. 0004263

(51) Int. Cl.[7] ............................................. E05D 15/10
(52) U.S. Cl. .............................. 49/218; 49/216; 49/118
(58) Field of Search .......................... 49/116, 118, 123, 49/360, 209, 210, 211, 216, 218, 219, 220, 225

(56) References Cited

U.S. PATENT DOCUMENTS

| | | | | |
|---|---|---|---|---|
| 3,906,668 A | * | 9/1975 | Simmons ...................... 49/212 |
| 4,091,570 A | | 5/1978 | Favrel | |
| 4,543,746 A | * | 10/1985 | Racca .......................... 49/118 |
| 5,142,823 A | * | 9/1992 | Brandenburg et al. ......... 49/118 |
| 5,483,769 A | | 1/1996 | Zweili | |
| 5,893,236 A | * | 4/1999 | Krbec et al. ................... 49/118 |
| 6,189,265 B1 | * | 2/2001 | Fink ............................ 49/118 |
| 6,385,910 B1 | * | 5/2002 | Smink et al. .................. 49/218 |

FOREIGN PATENT DOCUMENTS

| | | |
|---|---|---|
| DE | 1555327 | 8/1970 |
| DE | 8509717 | 7/1985 |
| EP | 0492743 | 7/1992 |
| EP | 0820889 | 1/1998 |

* cited by examiner

Primary Examiner—Jerry Redman
(74) Attorney, Agent, or Firm—Thomas R. Vigil; Welsh & Katz, Ltd.

(57) ABSTRACT

A sliding door operating mechanism for a vehicle to provide access to the vehicle through an opening in a wall thereof, includes at least one sliding door and a reciprocating power mechanism and a transmission mechanism for transmitting movement of power to the door for performing opening, closing and locking movements thereof. A beam structure carries the door, the power mechanism and the transmission mechanism. The beam structure extends across and is accommodated within an upper portion of the opening so as to be slidingly movably driven by the power mechanism between a relatively retracted position within the opening, in which the door is located in a first plane in a closed position confirmed within the opening, and a relatively less retracted position, in which the door is located in a second plane exteriorly of the opening allowing movement of the door along the second plane.

12 Claims, 10 Drawing Sheets

VEHICLE DOOR OPERATING MECHANISM

CROSS REFERENCE TO RELATED APPLICATIONS

This application is a continuation of PCT/SE01/02572 filed Nov. 21, 2001, which claims the benefit of priority from Swedish Patent Application No. 0004263-0, filed Nov. 21, 2000.

BACKGROUND OF THE INVENTION

1. Field of the Invention

The present invention concerns a vehicle door operating mechanism, specifically a mechanism for opening and closing a sliding door of a vehicle to provide access to the vehicle through an opening in a wall thereof.

2. Description of the Related Art

It is a general desire among vehicle constructors and designers to provide a sliding door operating mechanism, that includes a minimum of components and a minimum of adjustment places, and that is compact and flexible in its adaption to different vehicle types.

It is also a desire to provide a sliding door operating mechanism that makes opening of a vehicle door impossible during movement of the vehicle.

A further desire is to provide a sliding door operated by a reciprocating power means, such as a pneumatic piston movable within a cylinder, having a travel less than movement of said door between an open and a closed position.

A particular desire is to have access to a sliding door module ready for installation in a vehicle, such door module comprising a frame structure carrying one or more door leaves as well as devices for opening, closing and locking the door blade or blades.

BRIEF SUMMARY OF THE INVENTION

The present invention complies with the desires mentioned by providing a sliding door operating mechanism for a vehicle to provide access to said vehicle through an opening in a wall thereof, including sliding door means and reciprocating power means and transmission means for transmitting movement of said power means to said door means for performing opening, closing and locking movements thereof, which mechanism is characterized by a beam structure carrying said door means, said power means and said transmission means, said beam structure extending across and being accommodated within an upper portion of said opening so as to be slidingly movably driven by said power means between a relatively retracted position within said opening, in which said door means is located in a first plane in a closed position confined within said opening, and a relatively less retracted position, in which said door means is located in a second plane exteriorly of said opening allowing movement of said door means along said second plane.

Apart from the door means, also the reciprocating power means and the transmission means are carried by the beam structure, the power means being of the kind having a housing means and a rod means extendable and retractable relative to the housing means, such as a hydraulic, or, preferably, a pneumatic cylinder with an associated piston and piston rod, or an equivalent, fully mechanical device, such as a device transforming a rotational movement into a linear movement, or any other linear motor. The rod means is connected to the transmission means so as to transfer its movements to the door means, while the housing means is rigidly attached to a sliding member extending in the longitudinal direction of the beam structure and being slidable in that direction relative to the beam structure.

As stated above, in the less retracted position of the beam structure the door means is free to move in its opening direction, and, of course, in its closing direction, operated by the rod means of the power means. When in its fully closed position, however, the rod means cannot move further in its corresponding closing stroke direction. Instead, the housing of the power means moves in an opposite direction, and this movement causes a corresponding longitudinal displacement of the sliding member relative to the beam structure. This longitudinal displacement of the sliding member is transformed into a lateral movement of the beam structure and the door means. This may suitably be accomplished by means of co-operating cam means on the sliding member and stationary cam means, the beam structure being restricted from movement in its longitudinal direction, but guided for movement in its transverse direction, i.e., perpendicularly to the plane of the frame structure and the door means. This transverse movement of the beam structure and the upper portion of the door means is advantageously transferred to the bottom portion of the door means by a link system such that the door means is imparted a controlled, parallel movement.

BRIEF DESCRIPTION OF THE SEVERAL VIEWS OF THE DRAWINGS

The present invention will now be described more in detail in connection with a double door embodiment thereof, reference being made to the accompanying schematic drawings, wherein:

FIG. 5 is a part sectional view at an enlarged scale seen from the left in FIG. 4a;

FIGS. 6a, b and c show a link system for controlling a lower part of the door;

DETAILED DESCRIPTION OF THE INVENTION

Figure 1A:
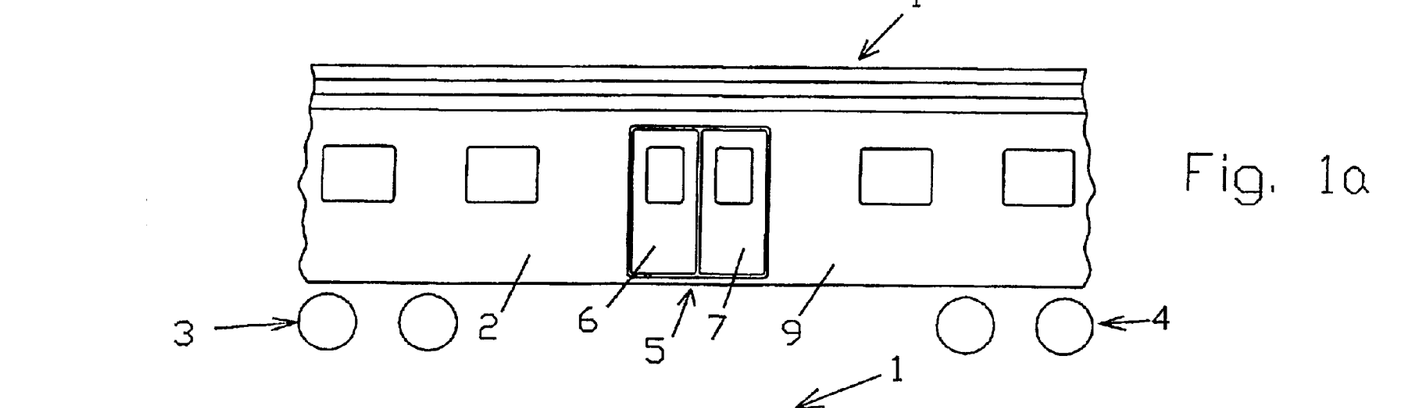
FIGS. 1a and b are side views of a section of a vehicle having a two-leaf sliding door shown in a closed and an open position, respectively.
Figure 1B:
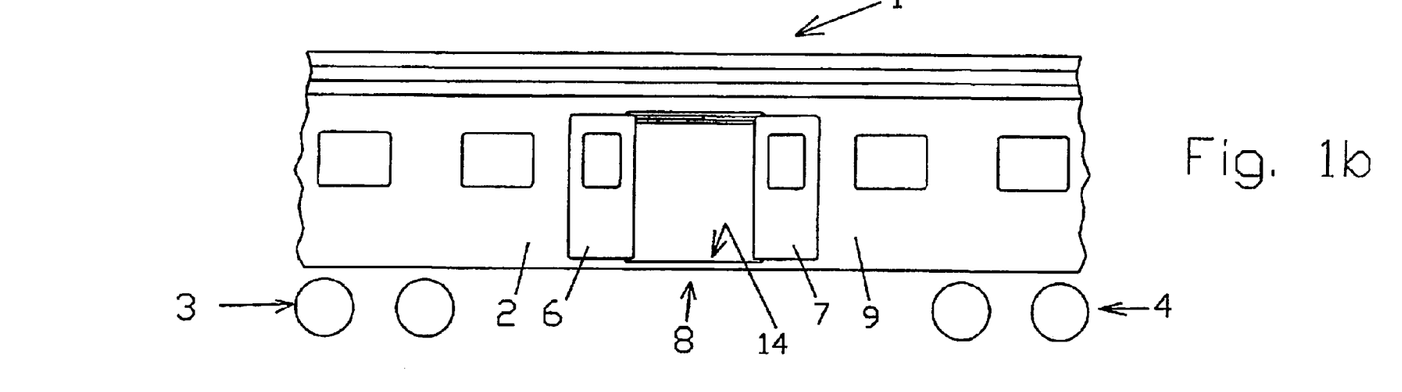
Figure 2:
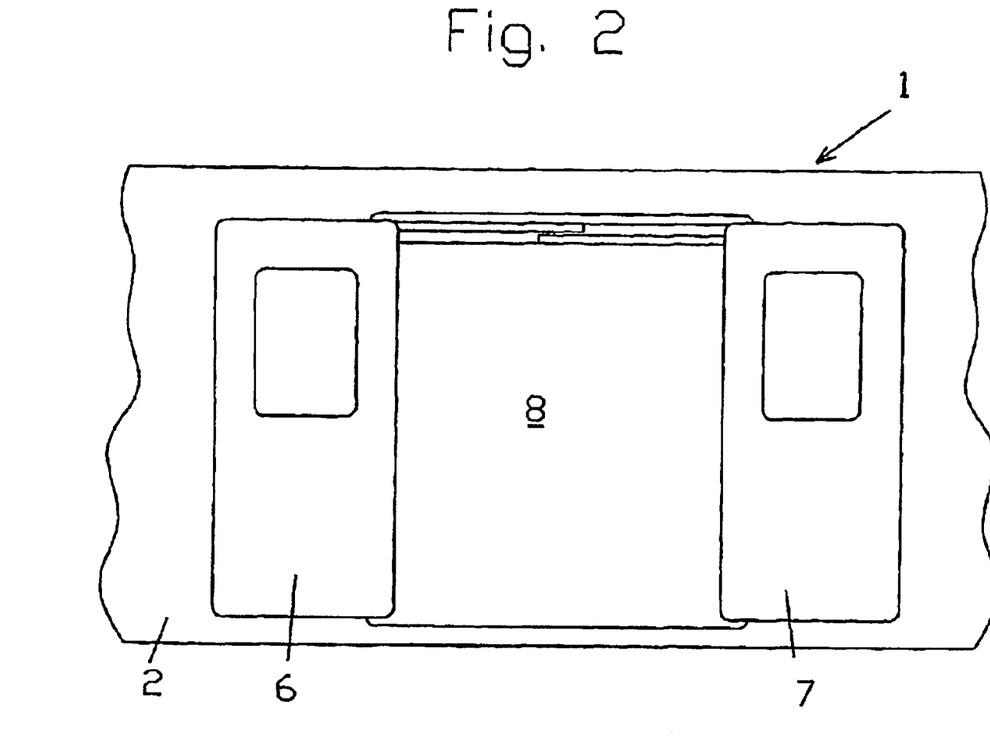
FIG. 2 is an enlarged view of a portion of FIG. 1b showing parts of the door operating mechanism.

In FIGS. 1a and b is shown a section of a railway carriage 1 having a body 2 supported by two bogies 3 and 4. A sliding door 5 is shown having two door blades 6 and 7 slidable between a closed position shown in FIG. 1a and an open position shown in FIG. 1b and also shown in FIG. 2, the latter position giving access to the interior of the vehicle through an opening 8 in an exterior wall 9 thereof. The opening 8 may be defined by portions of the vehicle ceiling, side wall and floor, but it is preferred to form these elements from a rectangular frame structure 10 having vertical left and right (as seen from inside the vehicle) side members 11, 12, a horizontal upper frame member 13 and a horizontal lower frame member 14 (indicated in FIG. 1b only).

A beam structure 15 having a substantially L-shaped cross section with a substantially horizontal web portion 16 and a substantially vertical flange portion 17 extends across the opening 8 between opposed faces of the frame members 11 and 12 and is carried by guide rollers 18, 19, respectively, mounted in end plates 20, 21, respectively, of the beam structure by means of bolts 22, 23, respectively. Substantially horizontally directed U-shaped guide channels 24, 25 mounted in the frame members 11, 12, respectively, receive the guide rollers 18, 19, respectively, so as to guide horizontal movement of the beam structure 15 from a fully retracted position within the confines of the frame structure 10 shown in FIG. 4b to a more extended position shown in FIG. 4a.

The door leaves 6 and 7 are carried by the beam structure so as to be flush with the exterior wall 9 of the vehicle in the fully retracted position of the beam structure (FIG. 4a) and also to be totally confined between the frame members 11 and 12 in that position which is the closed position of the door. In the less retracted position of the beam structure shown in FIG. 4a, the door leaves are free to be opened as far as restriction by the frame members 11 and 12 is concerned.

The door leaves are carried by the beam structure by means of parallel guide rails 26, 27 each including a first member 28, 29, respectively, attached to the flange portion 17, and a second member 30, 31, respectively, attached to the door leaf 6, 7, respectively. The first and second guide rail members are mutually guided so as to be telescopingly extendable and retractable. In their fully retracted position shown in FIG. 4b, the guide rails have an equal length substantially corresponding to the free width of the opening 8, whereas they are extendable so as to bring the door leafs to their fully open position shown in FIG. 4a. In that position, the guide rails are somewhat overlapping one another.

Figure 3A:
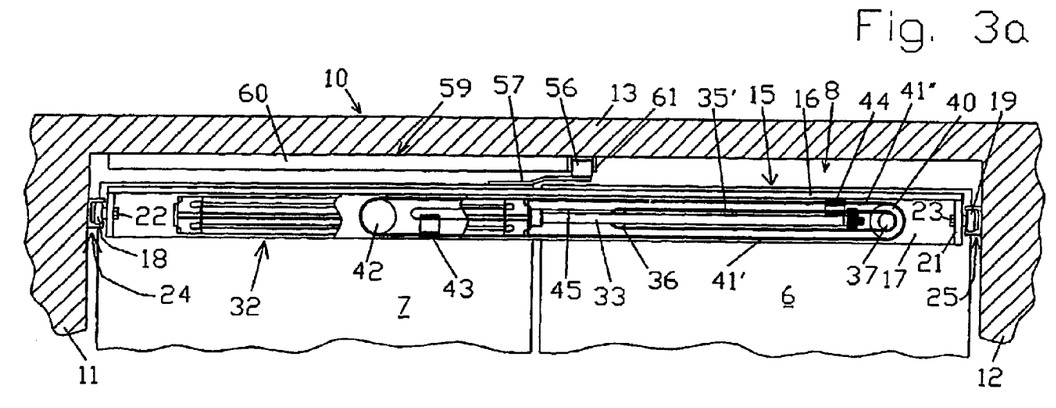
FIGS. 3a and b are views looking upon upper portions of the door operating mechanism according to a first embodiment thereof, and the door from inside the vehicle in a closed and an open position, respectively.
Figure 3B:
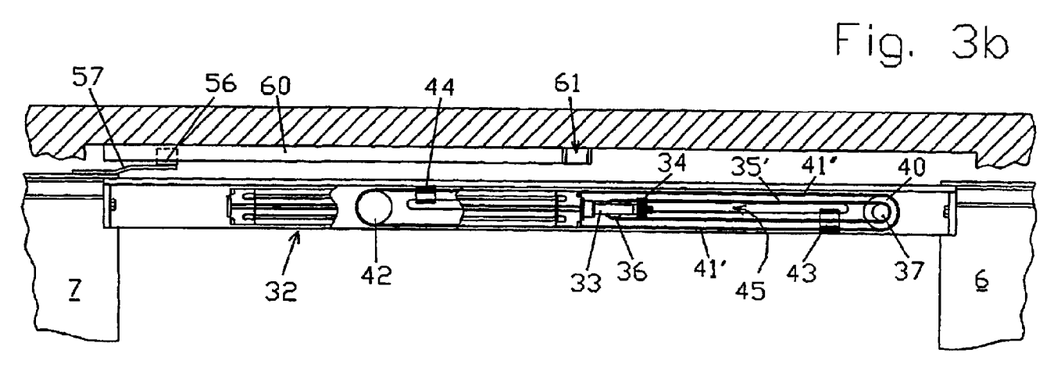
Figure 5:
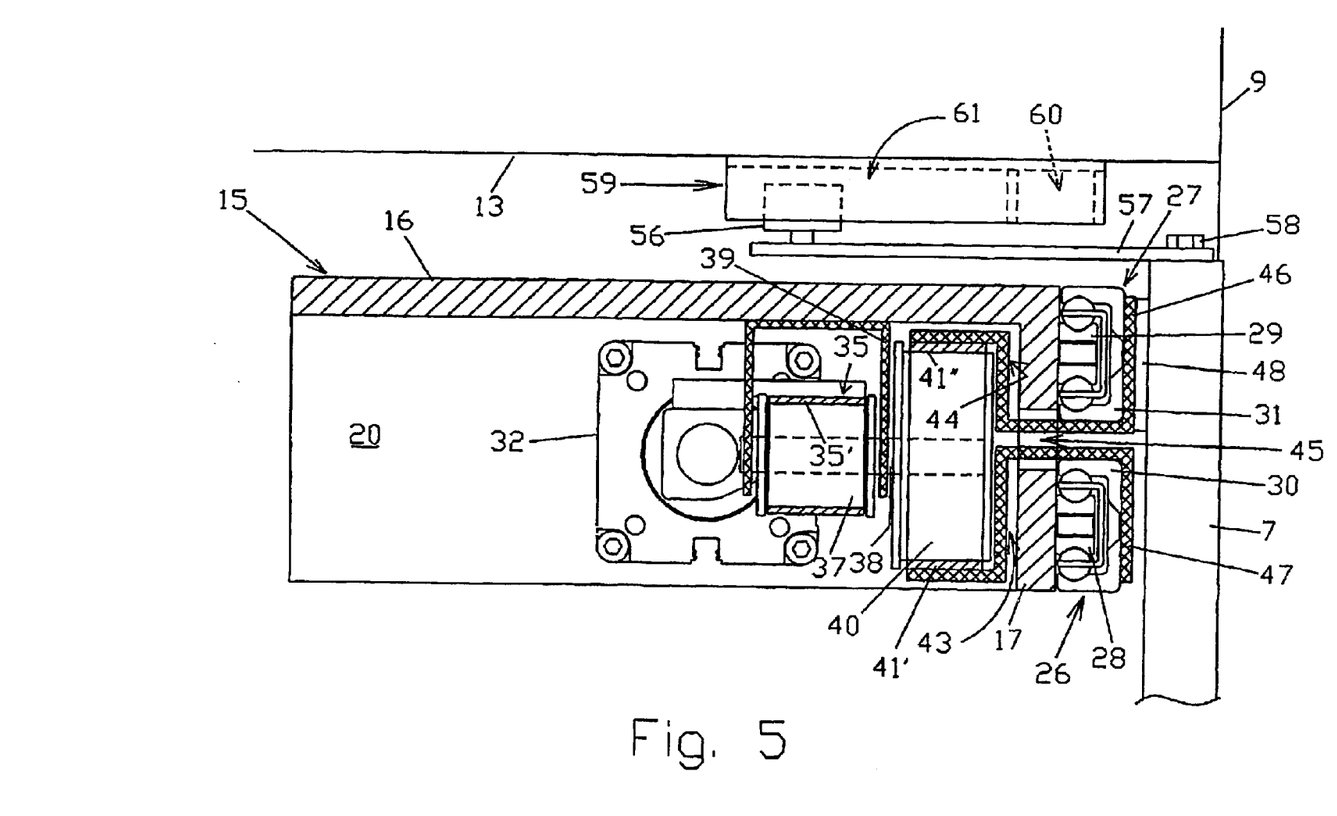
Figure 6:
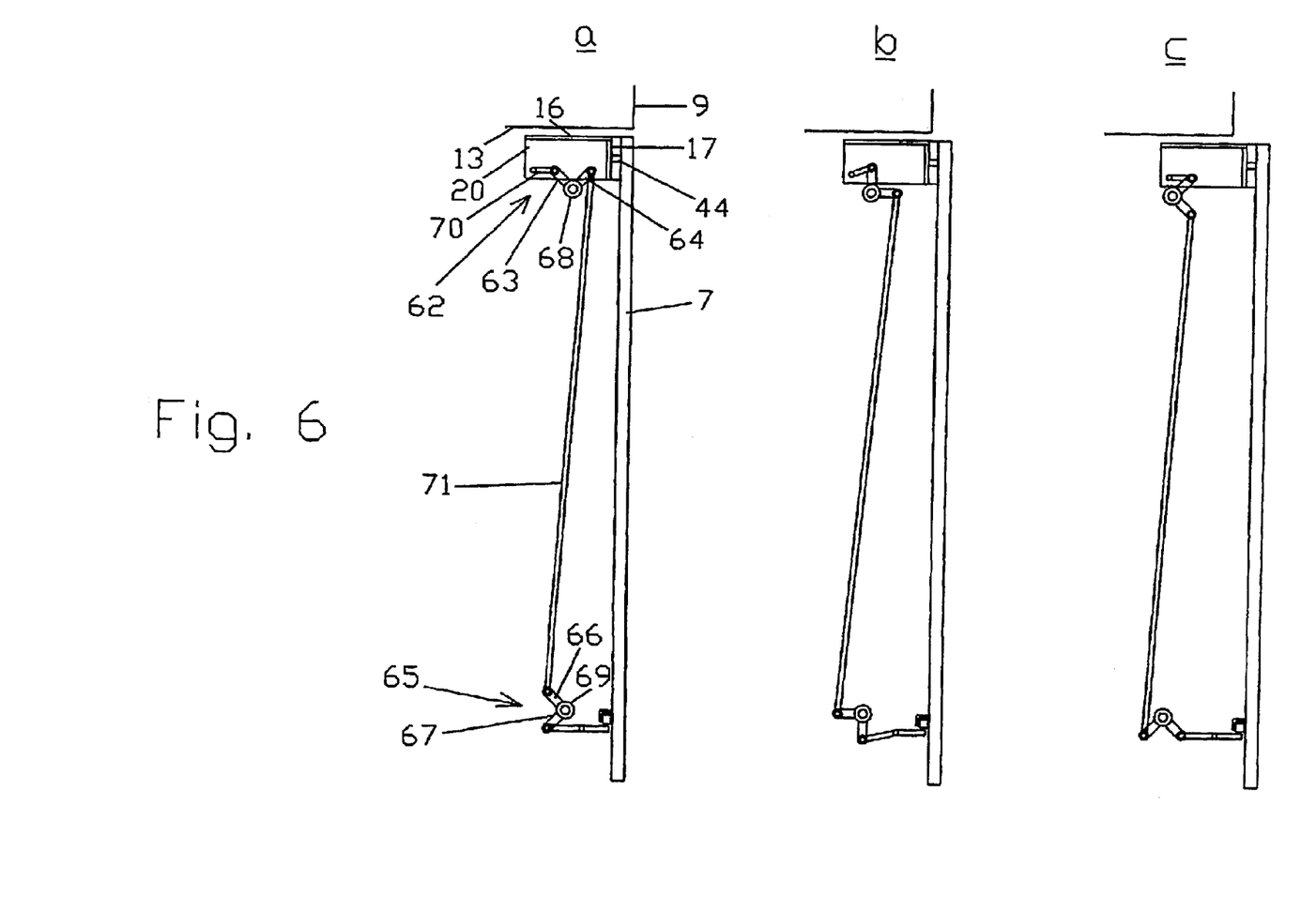

To control the reciprocating movement of the door leaves and of the beam structure it is preferred to use a pneumatic cylinder and piston device, whose cylinder or housing 32 is carried by the web portion 16 of the beam structure, while its piston rod 33 extends in the longitudinal direction of the beam structure. The free end of the piston rod is connected by means of a connecting piece 34 to an upper sling 35' of a first endless belt 35 extending between two idling rollers 36, 37. Roller 37 is carried by a shaft 38 journalled in a bracket 39 attached to the web portion 16. Shaft 38 also carries an idling roller 40 having a larger diameter than roller 37, preferably twice its diameter. A second endless belt 41 extends between roller 40 and a further idling roller 42. A lower sling 41' of belt 41 carries a first connecting piece 43 and an upper sling 41" thereof carries a second connecting piece 44. As appears from FIGS. 3a and b, these connecting pieces are located at opposite ends of the slings 41' and 41" in the closed and open positions of the door. Both connecting pieces extend through a longish slot 45 in the flange portion 17 and are connected to a respective one of the door leaves 6, 7. As seen in FIG. 5, an upwardly directed flange portion 46 of the connecting piece 44 is interposed between the door leaf 7 and the guide rail member 31 and connected to both. Correspondingly, a downwardly directed flange portion 47 of guide rail member 43 is interposed between door leaf 6 and guide rail member 30 (not shown). Shown in FIG. 5 is a spacer 48 keeping door leaf 7 clear from flange portion 47.

Figure 4A:
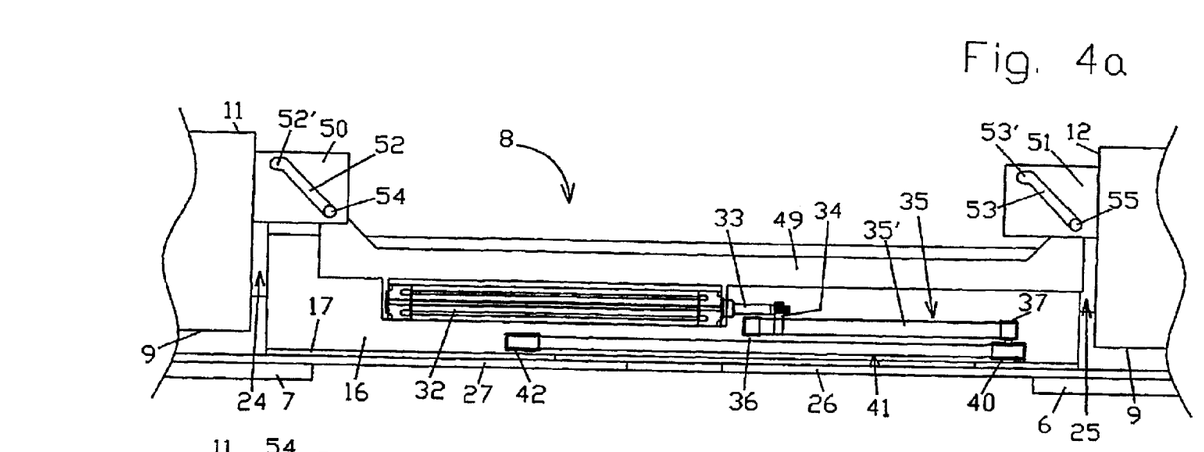
FIGS. 4a and 4b are views from below looking upwards on the door operating mechanism of FIGS. 3a and b in an open and a closed position of the doors, respectively.

As seen in FIGS. 3b and 4a, the piston rod 33 is in its retracted position when the door is open. In that position, the connecting members 43, 44 are at one of their extreme positions. Extension of the piston rod will bring the upper sling 35' of the belt 35 to the right of FIG. 3b and, consequently, rotate roller 37 in a clockwise direction. This rotation is transferred to roller 40 that will impart its movement to belt 41, whose lower sling 41' will move to the left and whose upper sling 41" will move to the right bringing along connection pieces 43 and 44, respectively, towards the closed position of the door. However, the stroke of the piston rod 33 is such, that it is not fully extended when the door leafs 6 and 7 reach a substantially abutting position shown in FIGS. 3a and 4b. In that position, further movement of the piston and piston rod relative to the beam structure and the belt 35 is restricted. However, the cylinder 32 is now free to move relative to the beam structure and the piston. This is accomplished in that the cylinder is firmly connected to the beam structure by means of a slide member 49 shown in FIGS. 4a and b only. This slide member extends along a major portion of the beam structure and is slidably connected thereto in a manner allowing the cylinder to be carried thereby. Thus, movement of the cylinder relative to the beam structure will result in movement of the slide member relative to the beam structure.

Connected to the frame structure 10, such as to its vertical frame members 11, 12, or its upper frame member 13, are two guide or cam plates 50, 51, each having an straight, oblique guide slot 52, 53, respectively. Close to its ends the slide member is provided with downwardly protruding studs or pins 54, 55 engaged in a respective one of the slots 52, 53.

In the initial position, i.e., when the door is just closed, the cylinder 32, the slide member 49 and the pins 54, 55 are in the positions shown in FIG. 4a. As soon as the piston is restricted from further movement, the cylinder, the slide member and the pins start moving to the left in FIG. 4a. Since the beam structure is prevented from lengthwise movement but free to move laterally guided by the guide rollers 18, 19 and guide channels 24, 25, movement of the pins along the slots 52, 53 will transform into a lateral movement of the slide member and the beam structure towards its retracted position shown in FIG. 4b.

It is evident, that in case the door leaves should encounter an object during their travel towards the closed position, that would restrict the door from closing, the cylinder would tend to move instead of the piston, thus moving towards the retracted position although the door leaves were not in the closed position. To prevent such situation, the door is provided with a guide means preventing inward movement of the door and the beam structure unless the door is in a closed position. In FIGS. 3a, 3b and 5 is shown such guide means comprising a guide roller 56 carried by one of the door leaves, in this case door leaf 7, by means of an arm 57 attached to the upper edge of the door by a screw 58. The roller engages in an L-shaped guide track 59 mounted in the upper frame member 13 and including one portion 60 extending in the direction of opening and closing movement of door leaf 7 and one portion 61 extending in the direction of retraction of the beam structure 15. Thus, as long as the door leaf is moving along track portion 60, any attempt to move in a perpendicular direction would be prevented, whereas, as soon as the roller 56 reaches track portion 61, which connects to track portion 59 not before the fully closed position of the door, movement of the roller, the door and the beam structure is enabled.

Figure 7:
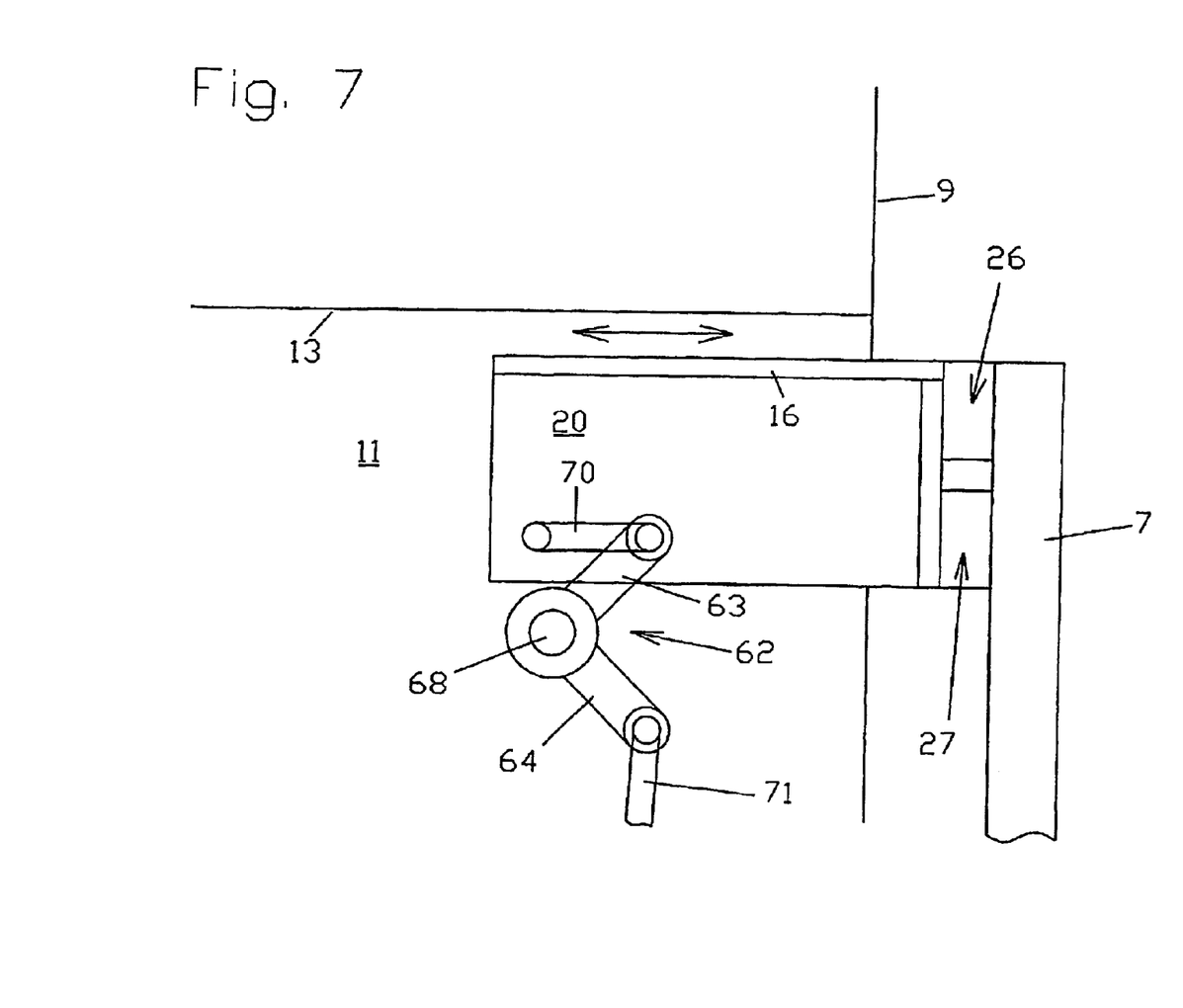
FIG. 7 shows an upper portion of FIG. 6b at an enlarged scale.
Figure 8:
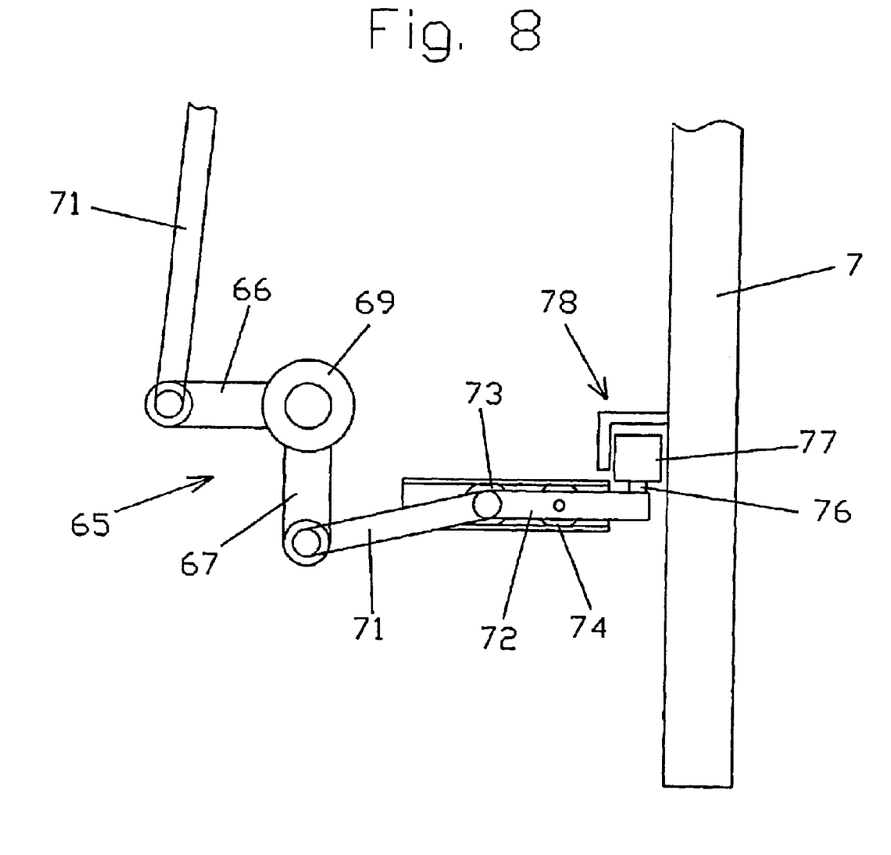
FIG. 8 shows a lower portion of FIG. 6b at an enlarged scale.

As appears from the foregoing description, only the upper part of the door is properly controlled by the mechanism so far described. However, the present invention proposes means for control of the lower part of the door as well. Such means comprises the link system shown in FIGS. 6 *a–c* and more in detail in FIGS. 7 and 8. It consists of an upper substantially L-shaped lever 62 having two arms 63, 64 and a lower correspondingly shaped lever 65 having two arms 66, 67. Lever 62 is pivotably attached to frame member 11 at the intersection 68 between arms 63 and 64, and lever 65 is likewise pivotably attached to frame member 11 at the intersection 69 between arms 66 and 67. A link 70 is pivotably attached at one end to end plate 20 of beam structure 15 and at its other end to arm 63. Thus, movement of the beam structure will rotate lever 62 about intersection 69. Movement of arm 64 is transferred to the lower lever 65 by a rod 71 linked to the free end of arm 64 and to the free end of arm 66. Thus, rotation of lever 62 will be transferred to lever 65. The free end of its arm 67 is pivoted to one end of a link 71 whose other end is linked to an inner end of a horizontally guided bar 72 which is guided by means of two rollers 73, 74 in a guide track 75 resembling guide track 59. A vertical shaft 76 carries a guide roller 77 that engages in an L-shaped guide rail 78 inwardly protruding from door leaf 7 and having a vertical flange 79. Thus, lateral movement of beam structure 15 will be transferred into a corresponding lateral movement of bar 72 and roller 77 which in turn influences the door by contact against flange 79 or the door leaf 7 itself. A corresponding link system is arranged for the other door leaf 6.

Figure 4B:
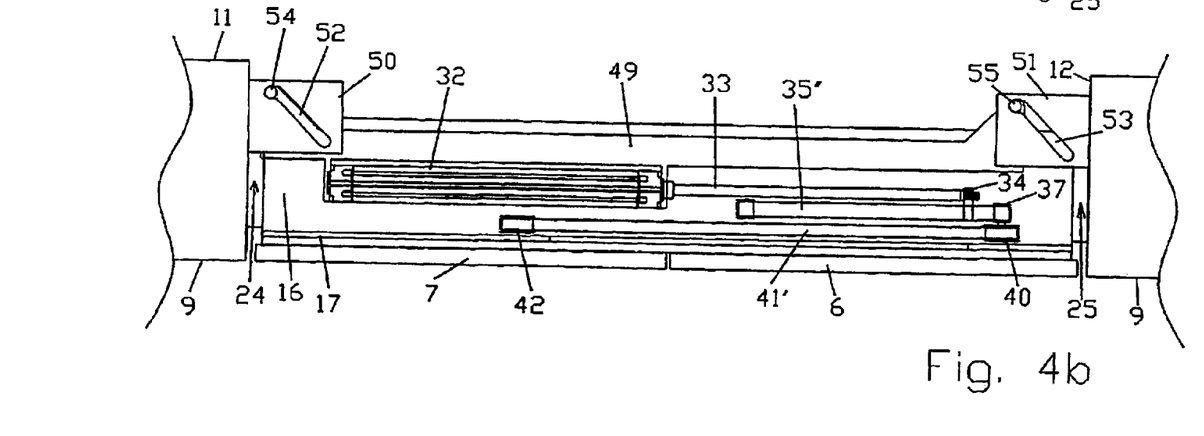

Returning to FIGS. 4*a* and *b*, it will be seen that the straight slots 52, 53 terminate with short slot portions 52', 53', respectively, that are directed perpendicularly to the lateral direction of movement of the beams structure. Thus, having reached these slot portions 52', 53', as shown in FIG. 4*b*, the pins 54, 55, and with them the slide member 49, the beam structure 15 and the door will be prevented from moving in the lateral direction enabling opening of the door.

Figure 9:
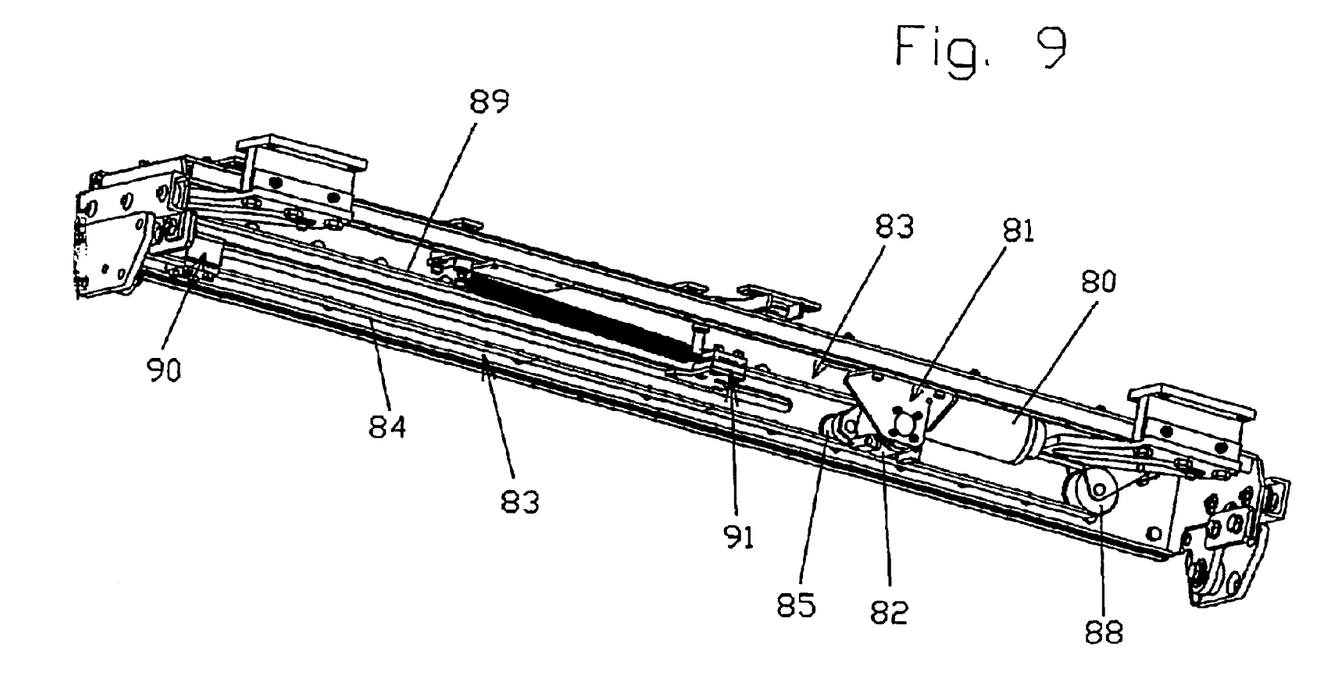
FIG. 9 is a perspective view from below of a second embodiment of the invention.
Figure 10:
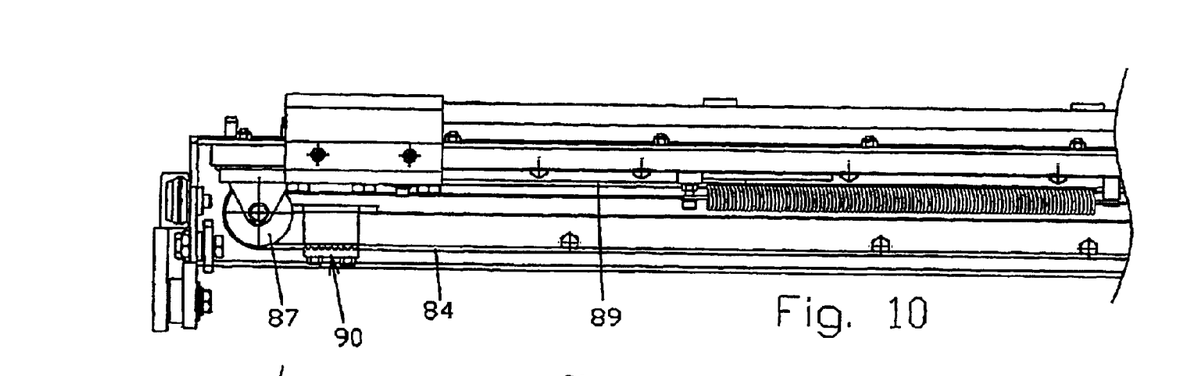
FIG. 10 is a side view of the left hand part of the second embodiment.
Figures 11, 11A:
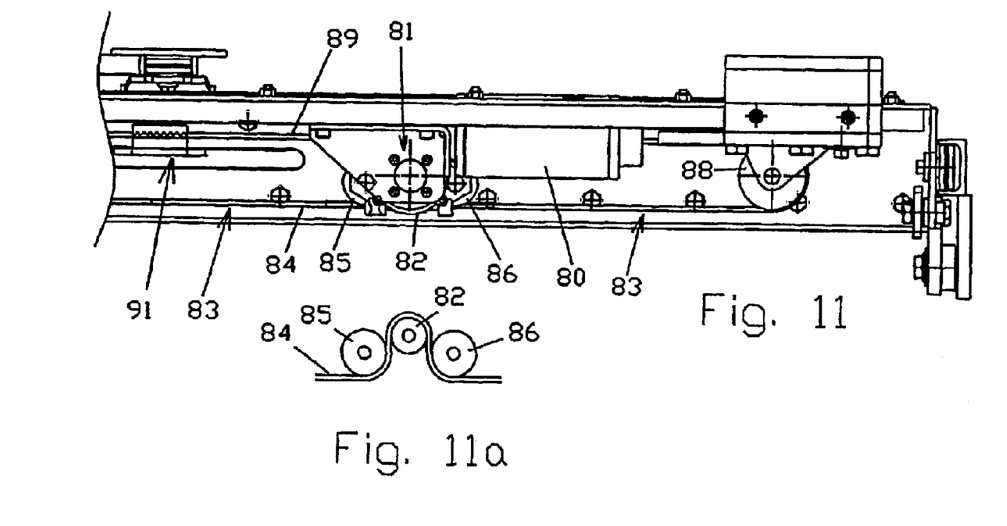
FIG. 11 is a side view of the right hand part of the second embodiment.
FIG. 11a is a detail of FIG. 11.

The second embodiment of the present invention shown in FIGS. 9–11 utilises a wheel and belt combination as power means. An electric motor 80 drives a worm gear 81 driving in turn a belt wheel 82, preferably a toothed wheel. The motor, the gear and the wheel are fixed to the beam structure 15 in a corresponding manner as the cylinder 32. A belt 83, preferably a toothed belt, is driven by the wheel 82. A lower part 84 of the belt is held around a major portion of the circumference of the wheel 82 by two idling rollers 85, 86 to form an Ω like sling as shown in FIG. 11*a*. The ends of the belt are guided by idling rollers 87, 88 between the upper part 89 of the belt runs. The lower part 84 carries a first door leaf supporting clamp member 90 (FIG. 10), whereas the upper part 89 carries a second door leaf supporting clamp member 91 (FIG. 11).

In the second embodiment, the motor 80, the worm gear 81 and the belt wheel 82 are analogous with the cylinder 32 in the first embodiment, whereas the belt 83 is analogous with the combination of the piston rod 33, the first belt 35 and the second belt 41.

What is claimed is:

1. A sliding door operating mechanism for a vehicle to provide access to said vehicle through an opening (8) in a wall (9) thereof, including a beam structure (15) carrying door means (6, 7), power means (32, 33) and transmission means (35, 36, 37, 40, 41, 42) for transmitting movements of said power means to said door means for performing opening, closing and locking movements thereof, said beam structure extending across and being accommodated within an upper portion of said opening (8) so as to be slidingly movably driven by said power means (32, 33) between a relatively retracted position within said opening (8), in which said door means (6, 7) is located in a first plane in a closed position confined within said opening, and a relatively less retracted position, in which said door means is located in a second plane exteriorly of said opening allowing movement of said door means along said second plane, characterized in that said power means includes two members (32, 33) relatively movable upon actuation of said power means, a first (32) of said members movably connected to said beam structure (15), and a second (33) of said members movable a predetermined travel relative to said first member (32) and being connected to said transmission means (35) so as to impart closing movement to said door means (6, 7) during a major part of said travel, in which said door means is located in said second plane, and to be prevented from further movement when said door means is in its closed position, said first member (32) being connected to said beam structure (15) such that further actuation of said power means moves said beam structure laterally toward its relatively retracted position.

2. The mechanism according to claim 1, characterized in that said first member (32) is connected to said beam structure (15) by means of an intermediate slide member (49) slidably connected to said beam structure such that movement of said first member (32) relative to said beam structure results in movement of said slide member (49) relative to said beam structure (IS), said slide member (49) and said opening (8) carrying co-operating cam means (52/54, 53/55) causing lateral movement of said beam structure relative to said opening in response to movement of said slide member (49) relative to said beam structure (15).

3. The mechanism according to claim 2, characterized in that said co-operating cam means include a cam slot (52, 53), obliquely directed relative to the direction of (32), and a pin (54, 55) engaged in said cam slot.

4. The mechanism according to claim 3, characterized in that said cam slot (52, 53) is provided in a plate connected to said opening (8) and said pin (54, 55) is carried by said slide member (49).

5. The mechanism according to claim 1, characterized in that sliding guide means connected to said beam structure carry an upper portion of said door means, and that a link system is arranged to transfer lateral movement of said beam structure to lower portions of said door means.

6. The mechanism according to claim 1, characterized in that said power means is comprises a cylinder and piston device, said two members comprising said cylinder and an associated piston.

7. The mechanism according to claim 1, characterized in that said transmission means is arranged to transform said predetermined travel of said second member into an increased travel of said door means.

8. The mechanism according to claim 7 characterized in that said transmission means includes two endless belts, a first belt encircling a first idling roller, having a relatively small diameter and a second belt encircling a second idling roller having a relatively large diameter, said first and second rollers being rigidly connected to a common shaft, and said second belt being connected to said door means.

9. The mechanism according to claim 8, said door means including two sliding door leaves, characterized in that a first door leaf is controlled by a first sling of said second belt and a second door leaf is controlled by a second sling of said second belt.

10. The mechanism according to claim 1, characterized in that said first of said members is a rotatable wheel (81) and said second of said members is one of an endless belt (83) or a chain driven by said wheel.

11. The mechanism according to claim 10, characterized in that one part (84) of the belt carries a first door leaf and the other part (89) of the belt carries a second door leaf.

12. The mechanism according to claim 1, characterized by a guide rail (59) for said door means preventing lateral movement thereof unless said door means is in said closed position.

* * * * *

UNITED STATES PATENT AND TRADEMARK OFFICE
CERTIFICATE OF CORRECTION

PATENT NO. : 6,792,717 B2
DATED : November 21, 2004
INVENTOR(S) : Carlsson et al.

It is certified that error appears in the above-identified patent and that said Letters Patent is hereby corrected as shown below:

Column 4,
Line 35, "an" should be -- a --;

Column 6,
Line 34, "(IS)" should be -- 15 --;
Line 42, after "of" insert -- movement of said second member --;
Line 54, after "means is" delete "comprises";
Line 55, after "two members" replace "comprising said" with -- being a --.

Signed and Sealed this

Fifth Day of April, 2005

JON W. DUDAS
*Director of the United States Patent and Trademark Office*